United States Patent
Maeda (10) Patent No.: US 7,966,580 B2
(45) Date of Patent: Jun. 21, 2011

(54) PROCESS-MODEL GENERATION METHOD, COMPUTER PROGRAM PRODUCT, AND PATTERN CORRECTION METHOD

(75) Inventor: Shimon Maeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 388 days.

(21) Appl. No.: 12/186,244

(22) Filed: Aug. 5, 2008

(65) Prior Publication Data

US 2009/0044167 A1    Feb. 12, 2009

(30) Foreign Application Priority Data

Aug. 6, 2007    (JP) .................................. 2007-204069

(51) Int. Cl.
*G06F 17/50*    (2006.01)
(52) U.S. Cl. .................... 716/51; 716/54; 430/5; 430/30
(58) Field of Classification Search .................... 716/51, 716/54; 430/5, 30
See application file for complete search history.

(56) References Cited

U.S. PATENT DOCUMENTS

| | | | |
|---|---|---|---|
| 6,902,855 B2 * | 6/2005 | Peterson et al. ................ | 430/30 |
| 7,065,738 B1 * | 6/2006 | Kim ................................ | 716/19 |
| 7,342,646 B2 * | 3/2008 | Shi et al. ......................... | 355/77 |
| 2005/0149902 A1 * | 7/2005 | Shi et al. ......................... | 716/21 |
| 2005/0210437 A1 * | 9/2005 | Shi et al. ......................... | 716/19 |
| 2006/0161452 A1 * | 7/2006 | Hess ................................ | 705/1 |

FOREIGN PATENT DOCUMENTS

| | | |
|---|---|---|
| JP | 2004-157160 | 6/2004 |
| JP | 2004-246223 | 9/2004 |

* cited by examiner

*Primary Examiner* — Naum Levin
(74) *Attorney, Agent, or Firm* — Finnegan, Henderson, Farabow, Garrett & Dunner, L.L.P.

(57) ABSTRACT

A process-model generation method according to an embodiment of the present invention comprises: forming a test pattern on a film to be processed by exposing a test mask having a mask pattern formed thereon; generating a plurality of process models having a different model parameter; performing a simulation of the mask pattern by using each of the process models to predict a plurality of model patterns; calculating a difference in dimension between the test pattern and each of the model patterns; extracting a model pattern in which the difference in dimension from the test pattern is within a scope of specification from the model patterns; and specifying the process model, which predicts the extracted model pattern, as the mask pattern.

6 Claims, 7 Drawing Sheets

PROCESS-MODEL GENERATION METHOD, COMPUTER PROGRAM PRODUCT, AND PATTERN CORRECTION METHOD

CROSS-REFERENCE TO RELATED APPLICATIONS

This application is based upon and claims the benefit of priority from the prior Japanese Patent Application No. 2007-204069, filed on Aug. 6, 2007; the entire contents of which are incorporated herein by reference.

BACKGROUND OF THE INVENTION

1. Field of the Invention

The present invention relates to a process-model generation method, a computer program product for generating a process model, and a pattern correction method, and, more particularly to a process-model generation method, a computer program product for generating a process model, and a pattern correction method, to be used for correcting optical proximity effects of a mask pattern.

2. Description of the Related Art

Generally, when a device pattern or the like is formed on a semiconductor device, a photolithographic technique is used to form a mask pattern on a film to be processed. Recently, however, as the mask pattern becomes finer, changes in pattern shape due to optical proximity effects at the time of photolithography are more noticeable. Therefore, when the mask pattern is formed, mask pattern correction taking into consideration changes in the mask pattern due to the optical proximity effects at the time of exposure, a so-called optical proximity correction (OPC) is performed.

For the correction of the mask pattern, a model based OPC has been known, in which after a test pattern is formed on the film to be processed by using the photolithography or the like, a photolithographic process model is formed based on actual measurement of, for example, a pattern width or the like of the test pattern, and an influence of the optical proximity effects is simulated by using the process model, to determine a position, a dimension, and the like of the mask pattern to be corrected (for example, see Japanese Patent Application Laid-open No. 2004-246223 (FIG. 7)).

However, in the model based OPC using only a specific process model, sufficient correction accuracy may not be ensured with respect to individual pieces of a mask pattern with a specific different width, space, or the like.

SUMMARY OF THE INVENTION

A process-model generation method according to an embodiment of the present invention comprises: forming a test pattern on a film to be processed by exposing a test mask having a mask pattern formed thereon; generating a plurality of process models having a different model parameter; performing a simulation of the mask pattern by using each of the process models to predict a plurality of model patterns; calculating a difference in dimension between the test pattern and each of the model patterns; extracting a model pattern in which the difference in dimension from the test pattern is within a scope of specification from the model patterns; and specifying the process model, which predicts the extracted model pattern, as the mask pattern.

A computer program product executable by a computer and having a computer readable recording medium includes a plurality of commands for generating a process model according to an embodiment of the present invention, wherein the commands cause the computer to execute: inputting pattern information relating to an arrangement of a test pattern formed on a film to be processed by exposing a test mask having a mask pattern; generating a plurality of process models having a different model parameter based on the input pattern information; performing a simulation of the mask pattern by using each of the process models to predict a plurality of model patterns; calculating a difference in dimension between the test pattern and each of the model patterns; extracting a model pattern in which the difference in dimension from the test pattern is within a scope of specification from the model patterns; and specifying the process model, which predicts the extracted model pattern, for each area divided according to the pattern information of the mask pattern.

A pattern correction method according to an embodiment of the present invention comprises: forming a test pattern on a film to be processed by exposing a test mask having a mask pattern formed thereon; obtaining pattern information relating to an arrangement of the test pattern; generating a plurality of process models having a different model parameter based on the pattern information; performing a simulation of the mask pattern by using each of the process models to predict a plurality of model patterns; calculating a difference in dimension between the test pattern and each of the model patterns; extracting a model pattern in which the difference in dimension from the test pattern is within a scope of specification from the model patterns; specifying the process model, which predicts the extracted model pattern, for each area divided according to an arrangement of the pattern information of the mask pattern, and generating association information in which the area divided according to the arrangement of the pattern information and the process model are associated with each other; obtaining arrangement information relating to an arrangement of design pattern designed to be a predetermined size as the mask pattern; extracting a process model corresponding to the arrangement information of the design pattern from the association information; and performing a simulation of the design pattern data by using the extracted process model, to correct the design pattern.

DETAILED DESCRIPTION OF THE EMBODIMENTS

Exemplary embodiments of a process-model generation method, a computer program product for generating a process model, and a pattern correction method according to the present invention will be explained below in detail with reference to the accompanying drawings.

Figure 1:
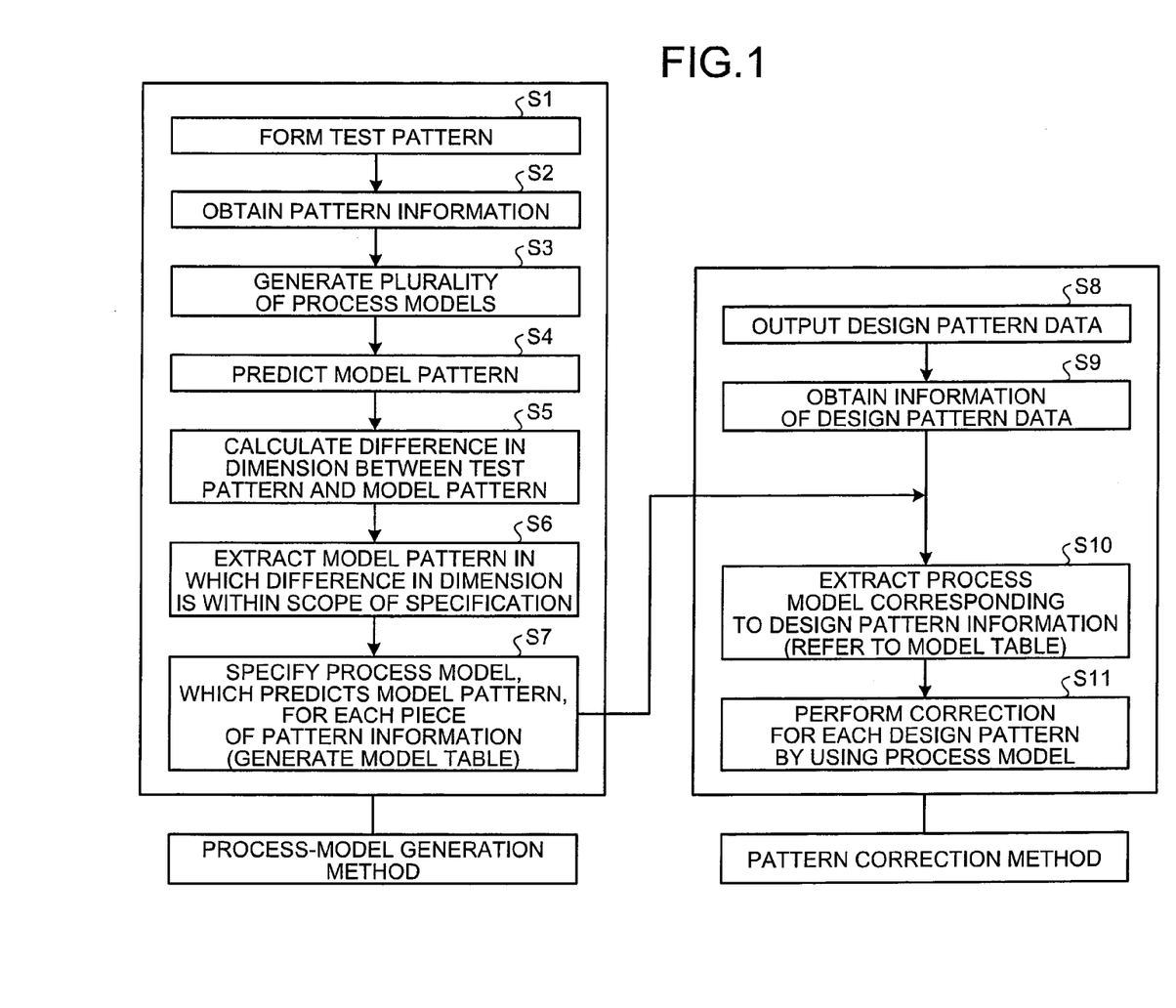
FIG. 1 is a flowchart of a process-model generation method according to a first embodiment of the present invention and a pattern correction method according to a second embodiment of the present invention.

With reference to FIG. 1, a process-model generation method according to a first embodiment of the present invention is explained first. FIG. 1 is a flowchart of the process-model generation method according to the first embodiment.

Figure 2:
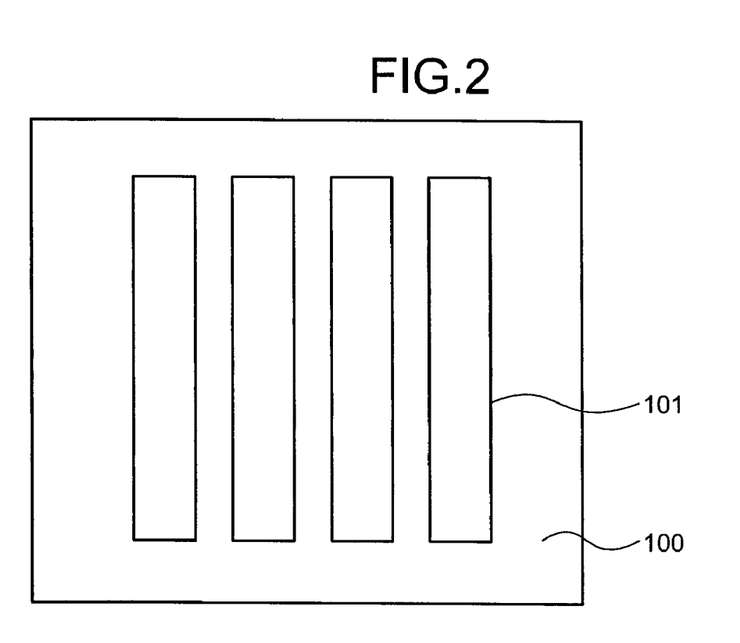
FIG. 2 is a plan view of a test mask according to the first embodiment.

A test photo mask (test mask) for generating a process model is prepared first. FIG. 2 is a plan view of a test mask 100. As shown in FIG. 2, a plurality of mask patterns 101, for example, line and space patterns is formed on the test mask 100 by a lithography system or the like.

Only representative mask patterns 101 are shown among mask patterns corresponding to various device patterns such as gate and circuit wiring, on the test mask 100 shown in FIG. 2. Therefore, various mask patterns having different dimensions and shapes are formed on the test mask 100 other than the mask patterns 101 shown in FIG. 2. That is, a pattern area with a narrow pattern width, a pattern area with a wide pattern width, a pattern area with a narrow pattern space, a pattern area with a wide pattern space, and the like are respectively formed.

Figure 3:
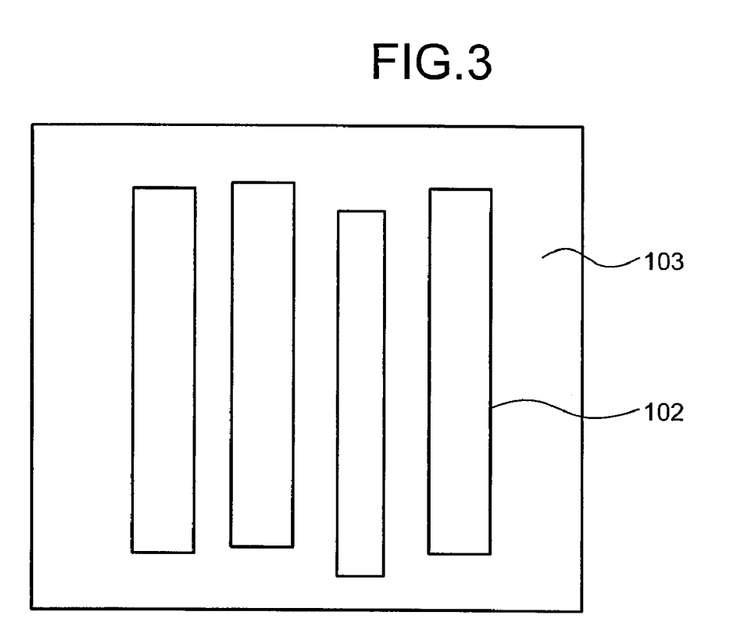
FIG. 3 is a plan view of a test pattern according to the first embodiment.

The test mask 100 and a wafer on which a resist film (a film to be processed) is applied are respectively set at predetermined positions of an exposure apparatus so that a test pattern 102 is transferred to the resist film by the photolithography using the test mask 100, and the resist film is developed to form the test pattern 102 (S1). FIG. 3 is a plan view of a resist film 103 (the film to be processed) having the test pattern 102 formed thereon by the photolithography. Because the test pattern 102 is formed under influence of the proximity effects caused by diffraction of exposure light, which passes through the test mask 100, the shape and the position thereof may be different from a desired shape and position.

Pattern information of the respective test patterns 102 formed on the film to be processed 103, for example, information including at least one of a dimension of the pattern width, a dimension of the pattern space, pattern position information in the entire pattern area, and pattern density for each divided predetermined area is obtained (S2). The pattern information of the test pattern 102 can be obtained based on image data of the test pattern 102 obtained by an image output unit such as a pattern verifier, a transmission electron microscope (TEM), or a scanning electron microscope (SEM), image output software, an image observation device, or the like.

Specifically, for example, a pattern edge, which is a contoured part of the test pattern 102, is divided into a plurality of edge forming parts, and pattern information of the dimension of the pattern width or pattern space or the like is measured for each divided edge forming part, thereby enabling to calculate the pattern width or the dimension of pattern space of the test pattern 102.

Figure 4:
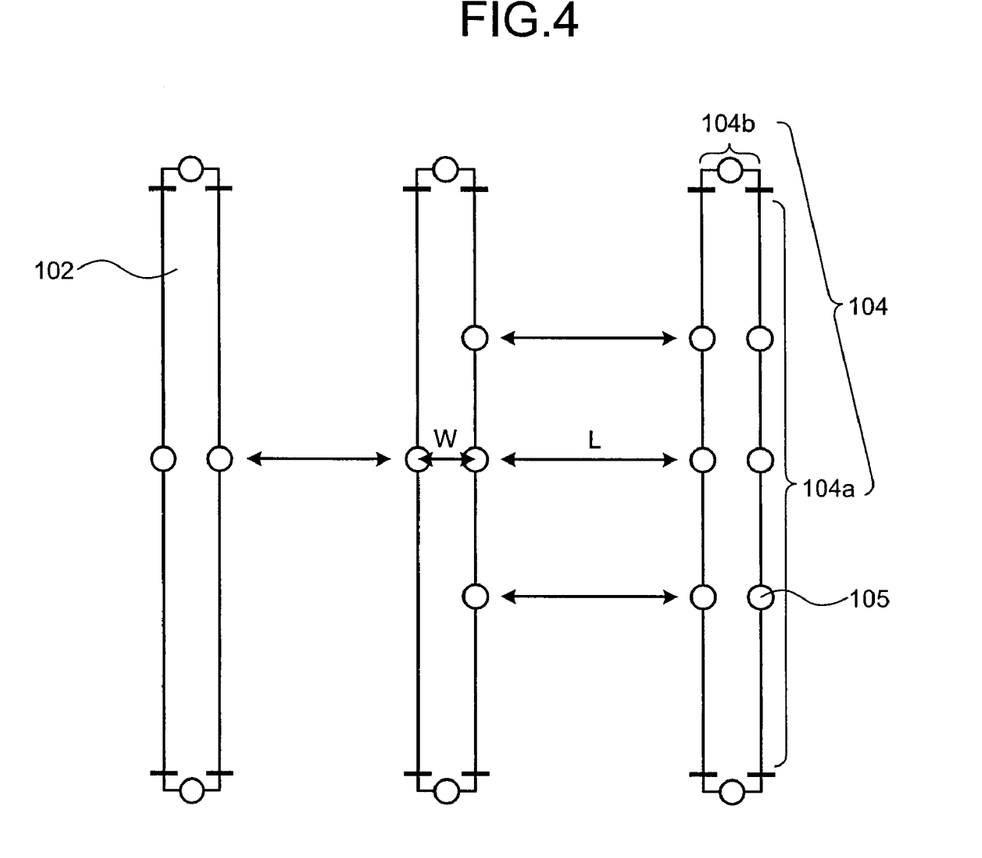
FIG. 4 is a plan view of a measurement method of a pattern width of the test pattern or a design pattern and a dimension of pattern space according to the first and second embodiments.

A method of measuring a pattern width W or a dimension L of pattern space of the edge forming part of the test pattern 102 is explained with reference to FIG. 4. FIG. 4 is an enlarged plan view of image data of a part of the test pattern 102.

The image data of the test pattern 102 is obtained first by using the pattern verifier or the like, to divide the pattern edge into a plurality of edge forming parts 104. There are various pattern-edge dividing methods. However, in the case of a rectangular line pattern as shown in FIG. 4, a rectangular pattern edge is divided into each side of a rectangular plane, which can be respectively designated as the edge forming part 104. In the line pattern as in the first embodiment, a long side of the rectangular plane of the pattern is specifically referred to as an edge side 104a, and a short side is specifically referred to as a line end 104b.

A measurement point 105 is then set to a predetermined position of the edge forming part 104 of the pattern. As shown in FIG. 4, the measurement point 105 can be set to one or a plurality of points in each edge forming part 104. Subsequently, a dimension from one measurement point 105 to another measurement point 105 set in the opposite edge forming part 104 of the same pattern is measured, to measure the pattern width W. Alternatively, a dimension from one measurement point 105 to another measurement point 105 set in the edge forming part 104 of an adjacent pattern is measured, to measure the dimension L of pattern space.

In the pattern-information measurement method of a line-and-space pattern shown in FIG. 4, the dimension measurement is performed vertically from another measurement point 105 set in the edge forming part 104 to the edge forming part 104. However, the measurement does not need to be performed in this direction. For example, the measurement is not limited to the example shown in FIG. 4, and the measurement point as an end point of measurement can be set at a position, at which a distance from the measurement point as a starting point of measurement to the opposite edge forming part of the same pattern or the edge forming part of an adjacent pattern becomes the shortest, and a distance between the measurement points set at the starting point and the end point can be set as the pattern width W or the dimension L of pattern space.

When a plurality of measurement points 105 are set to one edge forming part 104, a mean value of values measured from respective measurement points 105 can be set as the pattern width W or the dimension L of pattern space from the edge forming part 104.

As described above, the pattern width W or the dimension L of pattern space of the test pattern 102 is derived by measuring the pattern width W or the dimension L of pattern space from an individual edge forming part 104.

However, the pattern dimension or the like is not necessarily measured from the measurement point 105 of the individual edge forming part 104. For example, a dimension between predetermined edges of the same pattern can be set as the pattern width W, based on the image data of the pattern, and the shortest distance from the adjacent pattern can be set as the dimension L of pattern space of the pattern.

In the first embodiment, a pattern formed at the time of development of the resist film (the film to be processed) is designated as the test pattern 102. However, the test pattern 102 is not necessarily the pattern at the time of development. For example, a pattern obtained by developing the resist film and baking the resist film can be set as the test pattern. Further, a pattern obtained by baking a resist film having the pattern formed thereon and forming the pattern on an insulating film, which becomes the film to be processed below the resist film, by reactive ion etching (RIE) can be set as the test pattern. Thus, patterns in various stages can be set as the test pattern, and pattern information can be obtained in respective stages.

A process model is then generated based on the obtained pattern information. The process model in the first embodiment is a functional model for simulating a lithographic process at the time of forming the test pattern on a wafer according to the photolithography using the test mask. Therefore, the process model is generated by adjusting various model parameters so that the model pattern predicted by a simulation using the process model has the same dimension as that of the test pattern actually formed by the photolithography.

The process model in the first embodiment is generated by using a process-model generation tool or software for simulations, and the model parameters of the process model can include at least one of focus, exposure amount, exposure wavelength, numerical aperture of a lens, illumination shape, phase, aberration, pupil transmission factor, mask transmission factor, and development parameter of the exposure apparatus. When the process model is generated, taking a baking step or an etching step such as RIE into consideration, baking parameters such as baking temperature and baking time, and etching parameters such as etching gas and etching time can be included as the model parameter.

At this time, however, when the pattern information, for example, two pattern areas having a different dimension of pattern space are simulated by using the same process model, the model pattern having a desired dimension may not be predicted for both of the pattern areas. For example, when a simulation is performed by using the same process model with respect to a pattern area having a wide space from an adjacent pattern and a pattern area having a narrow space from an adjacent pattern, the model pattern of the pattern area having the narrow space from the adjacent pattern have substantially the same dimension as the test pattern. However, the dimension of the model pattern of the pattern area having the wide space from the adjacent pattern may be largely different from the test pattern.

Therefore, it is desired not to predict the model pattern by performing a simulation, using one process model with respect to the entire pattern area, but to select a process model to be applied, matched with the pattern information for each different pattern area.

Figure 5:
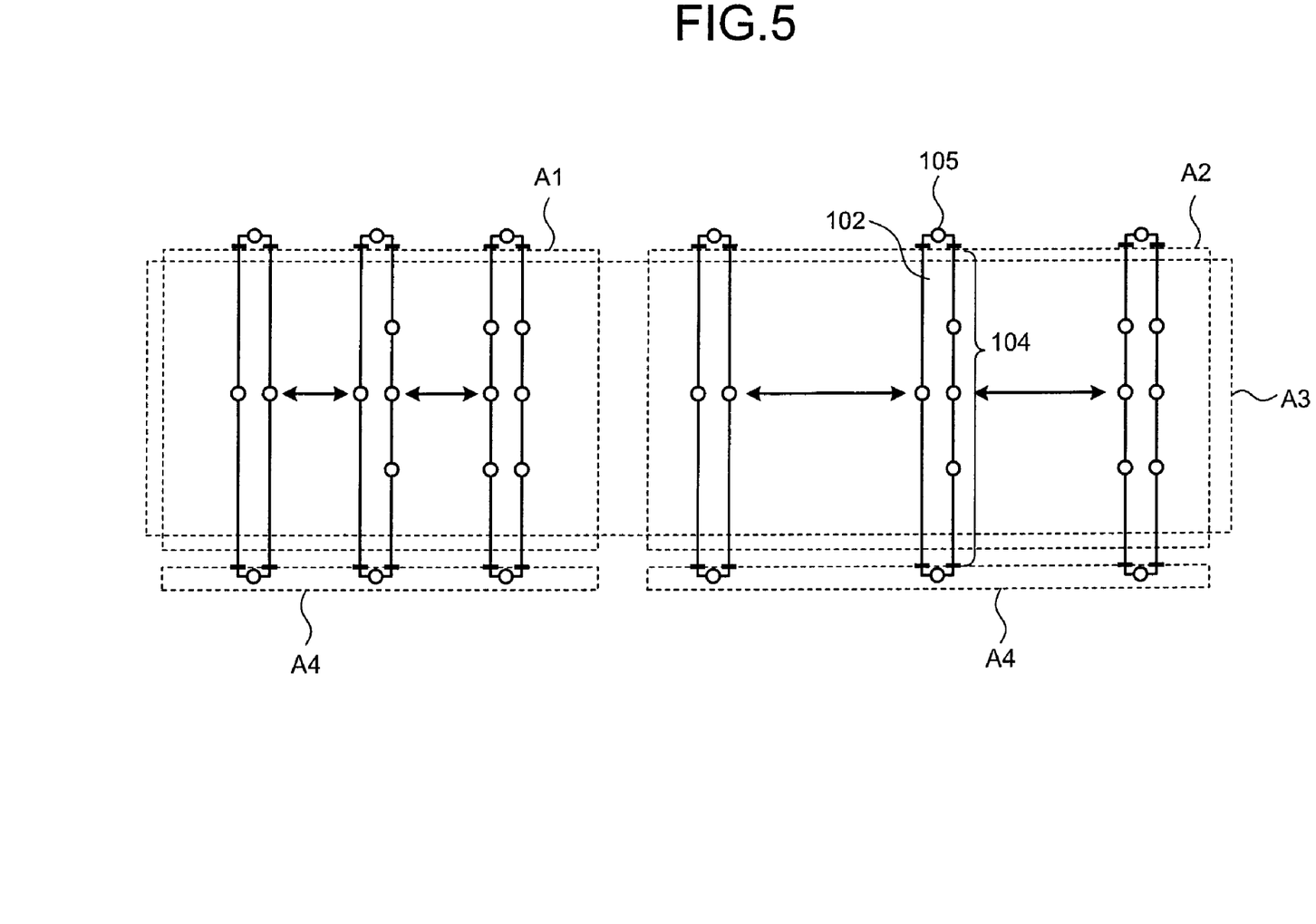
FIG. 5 is a plan view of the test pattern according to the first embodiment.

In the first embodiment, therefore, a plurality of process models is generated based on the pattern information of the measured test pattern (S3). FIG. 5 depicts a test pattern in which various pattern areas with different pattern information, that is, a pattern area Al having a small adjacent pattern space (dense pitch area), and a pattern area A2 having a large pattern space (sparse pitch area) are formed. In the first embodiment, a process model suited for the respective pieces of pattern information is formed with respect to the various pattern areas. That is, a first process model M1 in which a model parameter is adjusted to the pattern area A1 having a narrow pattern space, a second process model M2 in which the model parameter is adjusted to the pattern area A2 having a large pattern space, a third process model M3 adjusted to the pattern information of an entire pattern area A3, and a fourth process model M4 and a fifth process model M5 are generated. In addition, a process model suited for a narrow space area, a process model giving weight to a line-end area A4, and a process model in which the model parameter is adjusted to the dimension of each pattern width or pattern density in a predetermined area can be generated.

A simulation is then performed for forming the mask pattern on the resist film or the like for each of the process models, to predict respective model patterns formed on the resist film or the like (S4). That is, after obtaining the pattern information such as the pattern width of the mask pattern and the dimension of the pattern space, the pattern information is input to a simulation tool or the like, to perform a simulation using the process models, thereby obtaining pattern (model pattern) information predicted by each process model.

A difference in dimension between the test pattern obtained by actually exposing and developing a mask pattern of the test mask and a model pattern predicted by simulating the same mask pattern as the test mask by using the process models is then measured (S5).

Figure 6A:
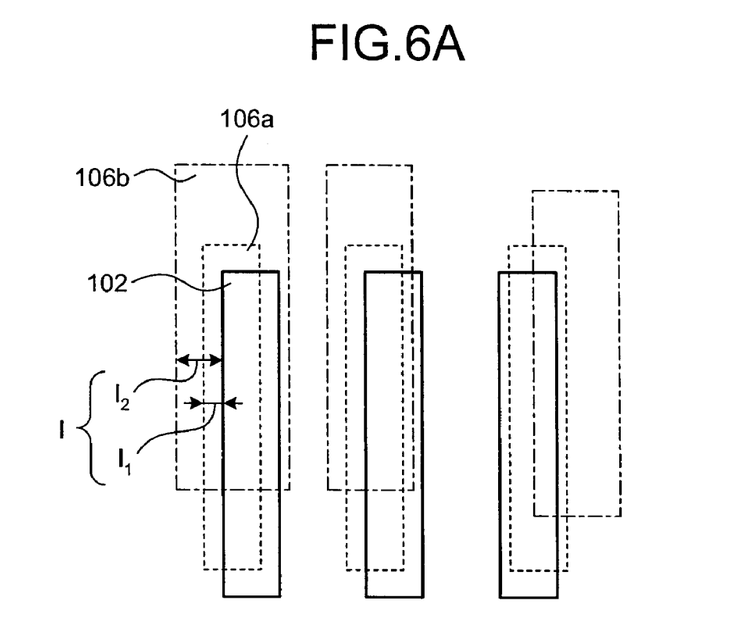
FIGS. 6A and 6B are plan views of a difference in dimension between the test pattern and a model pattern according to the first embodiment.
Figure 6B:
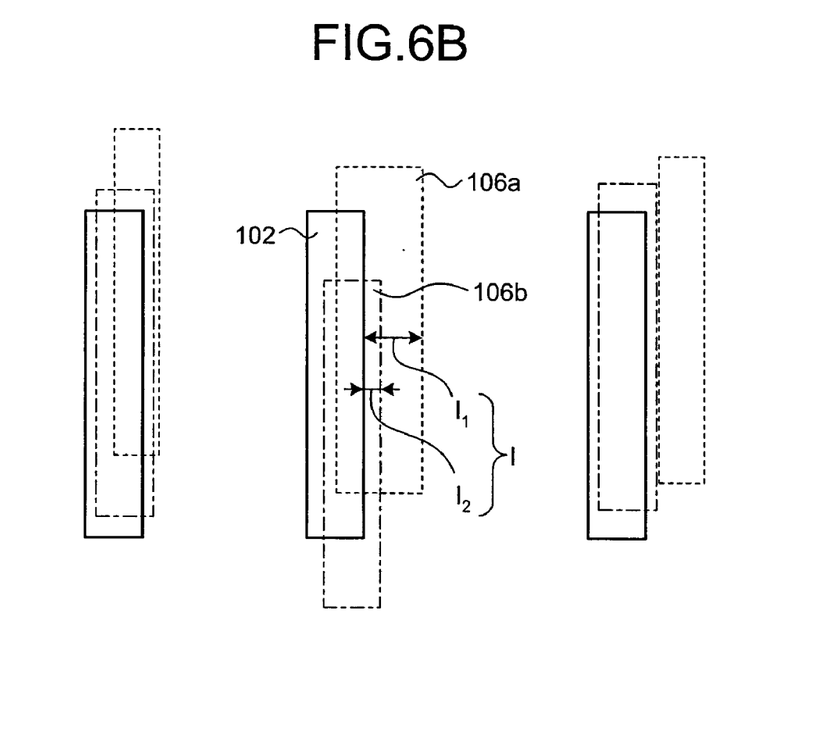

FIGS. 6A and 6B are pattern plan views of a difference in dimension 1 between the test pattern 102 and a model pattern 106 predicted by the process model. FIG. 6A depicts differences in dimension 11 and 12 between the test pattern 102 (solid portion) of a pattern area having a narrow pattern space and a model pattern 106a (dashed portion) obtained by predicting the same pattern area by a first process model M1, or a model pattern 106b (portion indicated by one-dot chain line) by predicting the same pattern area by a second process model M2. FIG. 6B depicts differences in dimension 11 and 12 between the test pattern 102 (solid portion) of a pattern area having a wide pattern space and the model pattern 106a (dashed portion) obtained by predicting the same pattern area by the first process model M1, or the model pattern 106b (portion indicated by one-dot chain line) by predicting the same pattern area by the second process model M2.

At this time, as shown in FIG. 6A, in the pattern area having the narrow pattern space, the difference in dimension 1 between the test pattern 102 and the model pattern becomes smaller in the model pattern 106a predicted by the first process model M1 adjusted to the pattern area having the narrow pattern space than in the model pattern 106b predicted by the second process model M2 adjusted to the pattern area having the wide pattern space (11<12). On the contrary, as shown in FIG. 6B, in the pattern area having the wide pattern space, the difference in dimension 1 between the test pattern 102 and the model pattern becomes smaller in the model pattern 106b predicted by the second process model M2 adjusted to the pattern area having the wide pattern space than in the model pattern 106a predicted by the first process model M1 adjusted to the pattern area having the narrow pattern space than (12<11).

The difference in dimension 1 between the test pattern 102 and the model pattern 106 is indicated by a distance between a predetermined edge of the test pattern 102 and a predetermined edge of the model pattern 106 corresponding to the test pattern 102, after obtaining the image data of the pattern. Further, the edge of each pattern is divided into the edge forming parts to measure a distance between the corresponding edge forming parts of the test pattern 102 and the model pattern 106, thereby enabling to calculate the difference in dimension 1 between the test pattern 102 and the model pattern 106 based on the measurement. Furthermore, when the dimension between the edge forming parts of the test pattern 102 and the model pattern 106 is measured, the measurement point is set to each edge forming part, and the dimension between the edge forming parts can be specified based on the measured dimension between the measurement points.

Next, a model pattern in which the measured difference in dimension between the test pattern and the model pattern is within a scope of specification is extracted from the model patterns (S6). Pattern arrangement information of the mask pattern corresponding to the test pattern and the model pattern is obtained, to specify a process model, which predicts the extracted model pattern, for each piece of the pattern arrangement information of the mask pattern (S7). At this time, when the pattern arrangement information is measured for each edge forming part, the model pattern is extracted for each edge forming part. The scope of specification of the difference in dimension between the test pattern and the model pattern is appropriately set as an allowable error satisfying required characteristics, and can be set based on, for example, the pattern width and the dimension of the pattern space.

Figure 7:
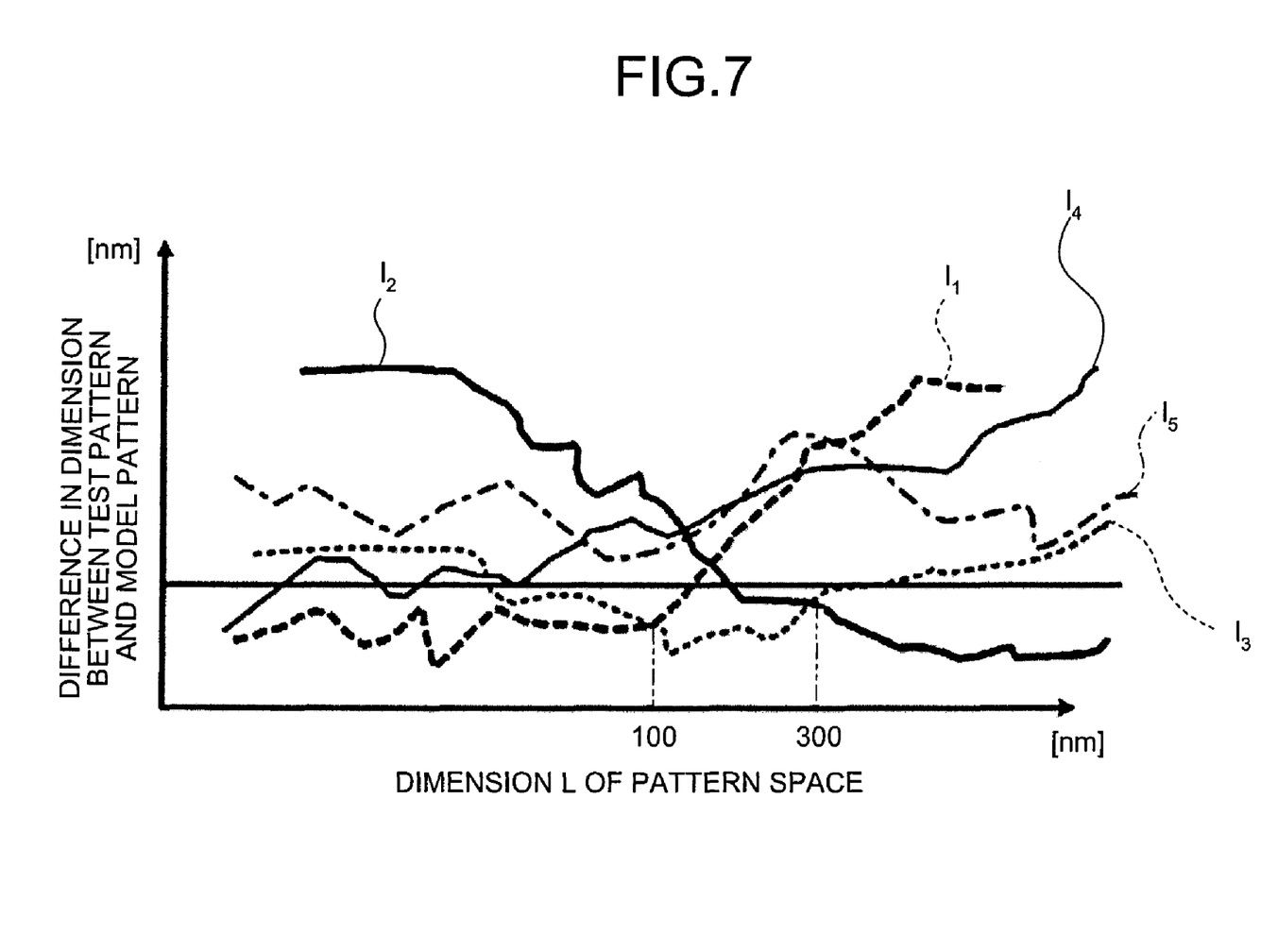
FIG. 7 is a graph of a difference in dimension between the test pattern and the model pattern based on pattern arrangement information according to the first embodiment.

A method of specifying the process model for each of the pattern arrangement information of the mask pattern, for example, for each of the dimension of the pattern space by extracting the model pattern based on the difference in dimension between the test pattern and the model pattern is explained with reference to FIG. 7. FIG. 7 depicts differences in dimension 11 to 15 between first to fifth model patterns predicted by using the first to fifth process models M1 to M5 and the test pattern, for each dimension L of pattern space, where dimension L (nm) of the pattern space of the test pattern is plotted on X axis, and difference in dimension 1 (nm) between each model pattern and the test pattern is plotted on Y axis. Further, the scope of specification of the difference in dimension 1 between the model pattern and the test pattern is set equal to or smaller than $1x$ (nm).

In the first embodiment, because the first model pattern is predicted by the process model in which the model parameter is adjusted to the pattern area having a narrow pattern space, a difference in dimension between the test pattern and the model pattern satisfies the scope of specification in the pattern area having the dimension of the pattern space equal to or smaller than a predetermined range, and the difference in dimension from the test pattern becomes relatively small among the respective model patterns. In the first embodiment, therefore, in a pattern area having the pattern space of, for example, 10 nanometers or less, the first model pattern is selected, to specify the first process model M1, which predicts the first model pattern. On the other hand, in a pattern area having a predetermined dimension of the pattern space, for example, 300 nanometers or larger, the second model pattern is within the scope of specification, and has a dimension relatively close to the test pattern among the respective model patterns. In the first embodiment, therefore, in a pattern area having the dimension of the pattern space of 300 nanometers or larger, the second model pattern is selected, to specify the second process model M2, which predicts the second model pattern. In the pattern area in which the dimension of the pattern space is larger than 100 nanometers and smaller than 300 nanometers, a third model pattern predicted by the third process model M3 adjusted to the entire pattern area, that is, adjusted so that both the pattern having the narrow pattern space and the pattern having the wide pattern space are predicted relatively accurately is within the scope of specification of the pattern area, and can relatively reduce the difference in dimension from the test pattern. Therefore, in the pattern area having the pattern space larger than 100 nanometers and smaller than 300 nanometers, the third model pattern is extracted, to specify the third process model M3, which predicts the third model pattern.

According to the comparison above, a table that specifies an optimum process model is generated for each dimension of the pattern space of the mask pattern. In the first embodiment, the first process model M1 is used for a pattern having the pattern space equal to or smaller than 100 nanometers, the second process model M2 is used for a pattern having the pattern space equal to or larger than 300 nanometers, and the third process model M3 is used for a pattern having the pattern space larger than 100 nanometers and smaller than 300 nanometers, at the time of pattern correction, according to the table.

Thus, according to the process-model generation method according to the first embodiment, a highly accurate process model suited for the information of the pattern to be formed on the mask can be generated. Accordingly, a process model matching the pattern information of the individual design pattern can be applied, and a highly accurate simulation suited for the individual pattern can be performed.

In the first embodiment, five different process models M1 to M5 are generated based on the test pattern information; however, five process models does not always need to be generated. That is, if at least two process models having different model parameters are generated, a process model capable of predicting a highly accurate model pattern matched with the pattern information can be selectively specified, thereby enabling to generate a highly accurate process model.

Furthermore, in the first embodiment, at an extraction step of the model pattern, a model pattern having the smallest difference in dimension from the test pattern can be preferentially extracted from the model patterns within the scope of specification. Accordingly, a process model having the highest simulation accuracy can be specified for each pattern.

Further, in the first embodiment, the pattern information is arrangement information of the pattern, that is, the dimension of the pattern space. However, the dimension of the pattern width, the pattern area, the pattern density, or the like can be designated as the pattern information. In addition, the pattern information can be specified by combining at least two pieces of information such as the dimension of the pattern space and the pattern width, and the highly accurate process model can be generated for each piece of pattern information.

Further, the process model can be generated by including the baking parameters and the etching parameters as the model parameters of the process model, while taking into consideration the influence of baking and etching processes on the pattern shape or the like.

Referring back to FIG. 1, as a second embodiment of the present invention, a pattern correction method using the process model generated by the method according to the first embodiment is explained below.

As shown in FIG. 1, a design pattern designed to be a desired size as the mask pattern is output as image data graphically processed by a pattern correcting apparatus or the like (S8).

Next, the arrangement information of the output design pattern data, for example, the dimension information of the pattern space or the like is obtained (S9). The method for obtaining the dimension of the pattern space is the same as the method for obtaining the dimension of the pattern space of the test pattern described in FIG. 4 and the like in the first embodiment. For example, the dimension of the pattern space can be obtained by measuring the distance from the edge forming part or the measurement point set in the edge forming part in the output design pattern data to the edge forming part or the measurement point in the adjacent design pattern data.

A corresponding process model is then extracted according to the pattern information of the design pattern data, by referring to the table specifying the process model for each piece of the pattern information generated in the first embodiment (S10). For example, the first process model is extracted with respect to the predetermined design pattern data with the dimension of the pattern space being equal to or less than 100 nanometers according to the table shown in the first embodiment.

The design pattern is then corrected by using the extracted process model (S11). That is, a simulation is performed with respect to the design pattern data by using the process model extracted for each predetermined design pattern data, and it is verified whether the obtained pattern result indicates the desired position, shape, and size, and whether the obtained pattern result is within a range of the allowable error with respect to the design value. The design pattern data is then corrected so that the pattern result becomes the desired size and the like. At the time of correction, correction of the design pattern data is appropriately repeated until the design pattern data obtained by a simulation is within a required range.

When the information is obtained for each edge forming part of the pattern data at the time of obtaining the information of the design pattern data, the process model can be extracted for each edge forming part, and the extracted process model can be used to perform verification and correction for each edge forming part. Thus, if the pattern is corrected by applying an appropriate process model for each of a plurality of edge forming parts, more accurate correction can be performed with respect to an individual design pattern. Further, a distance to the measurement point of the adjacent edge forming part can be measured for each measurement point set in the edge forming part of the design pattern data, and the table is referred to according to the distance, to extract the corresponding process model.

Thereafter, the corrected design pattern is drawn on the mask by using an electron-beam lithography system, thereby generating the mask pattern.

According to the pattern correction method, because the design pattern can be corrected through a simulation using the highly accurate process model generated according to the pattern information, the correction accuracy of the design pattern formed on the mask can be improved. By using the mask on which the corrected mask pattern is formed for the photolithography, a pattern of a desired size can be formed on the resist film on the wafer or the like. For example, accuracy of dimension of the gate wiring of line and space formed in a semiconductor device such as a memory device can be improved.

Figure 8:
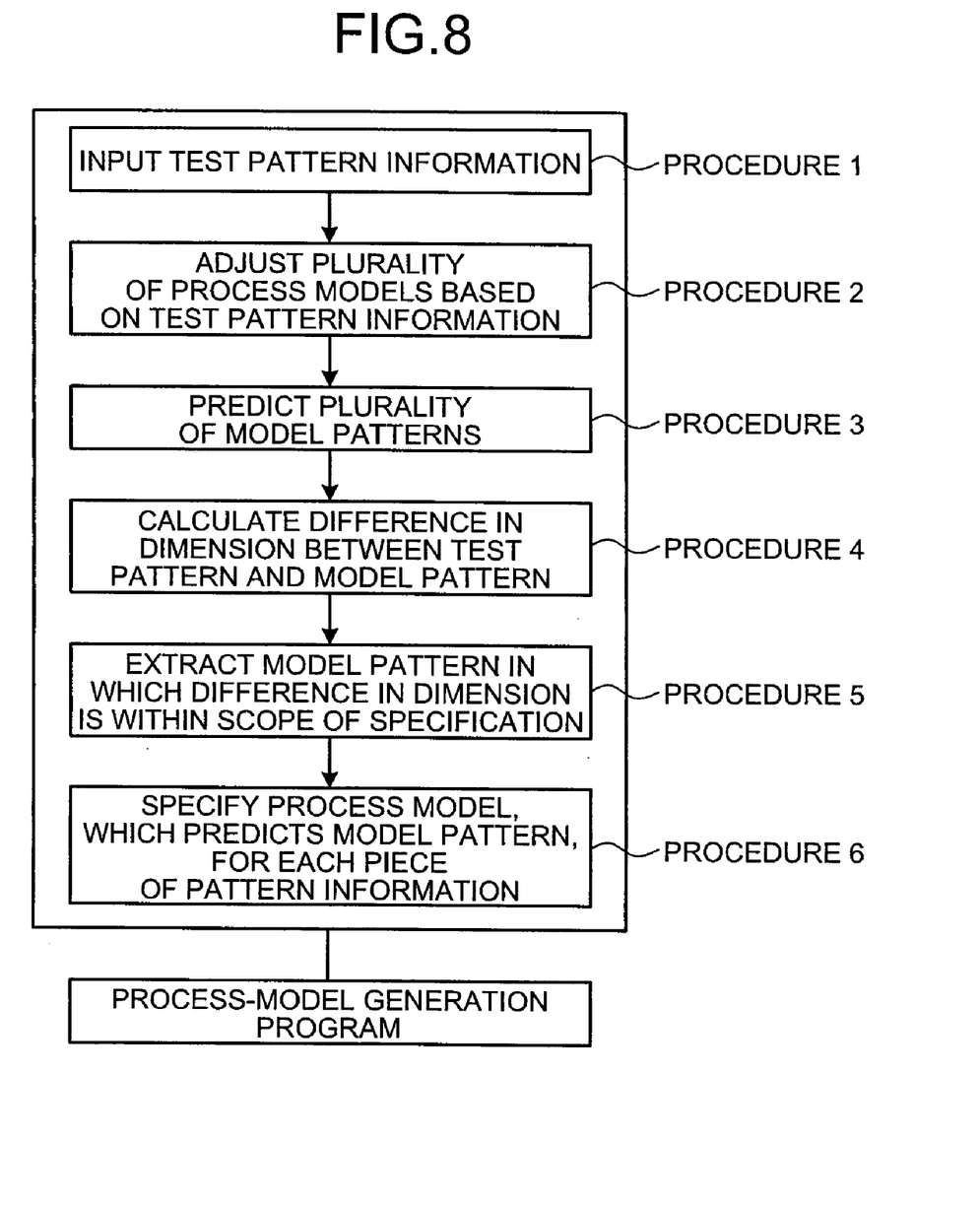
FIG. 8 is a flowchart of a procedure performed by a process-model generation program according to a third embodiment of the present invention.

A process-model generation program according to a third embodiment of the present invention is explained below with reference to FIG. 8. FIG. 8 is a flowchart of a procedure executed by the process-model generation program according to the third embodiment. The process model generated by the program according to the third embodiment is the same as that generated by the process-model generation method according to the first embodiment, and therefore redundant explanations thereof will be omitted.

The test mask having the mask pattern formed thereon is exposed beforehand, to form the test pattern. Subsequently, the pattern information of the test pattern, for example, the dimension of the pattern space and the like are obtained.

Subsequently, the pattern information of the test pattern is input by the program according to the third embodiment (procedure 1). A plurality of process models having a different model parameter is adjusted based on the input test pattern information (procedure 2). A simulation of the mask pattern is then performed by using the respective process models to predict a plurality of model patterns (procedure 3). A difference in dimension between the test pattern and the respective model patterns is calculated (procedure 4). A model pattern in which the difference in dimension from the test pattern is within the scope of specification is extracted from the model patterns (procedure 5). The process model, which predicts the extracted model pattern, is specified for each piece of information of the mask pattern obtained beforehand, for example, for each dimension of the pattern space (procedure 6).

According to the process-model generation program according to the third embodiment, the procedures 1 to 6 can be executed by a computer, and a highly accurate process model matched with the arrangement information of the pattern to be formed on the mask can be generated. Accordingly, a process model matching the pattern arrangement information of the individual design pattern can be applied, thereby enabling to perform a highly accurate simulation that is suited for the individual pattern.

As explained above, according to the embodiments of the present invention, the process-model generation method, the process-model generation program, and the pattern correction method capable of improving the pattern correction accuracy can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A process-model generation method comprising:
   forming a test pattern of a film to be processed by exposing a test mask having a mask pattern formed thereon with a lithography system;
   obtaining pattern information including at least one of
   a dimension of pattern width of the test pattern,
   a dimension of pattern space of the test pattern,
   pattern position information in the entire area of the test pattern, and
   pattern density for each divided predetermined area in the test pattern;
   generating, with respect to various pattern areas with different pattern information, a plurality of process models having a model parameter adjusted so as to correspond to the pattern information for each of the various pattern areas;
   performing a simulation of the mask pattern by using each of the process models to predict a plurality of model patterns;
   calculating a difference in dimension between the test pattern and each of the plurality of model patterns to the pattern information;
   extracting a model pattern in which the difference in dimension from the test pattern is within a scope of specification from the plurality of model patterns for each area divided according to the pattern information; and
   specifying the process model, which predicts the extracted model pattern, as the mask pattern.

2. The process-model generation method according to claim 1, wherein when the process model is specified, a process model, which predicts the extracted model pattern, is specified for each area divided according to the pattern information of the test pattern.

3. The process-model generation method according to claim 1, wherein when the process model is specified, a process model, which predicts the model pattern having the smallest difference in dimension from the test pattern, is specified.

4. A computer program product executable by a computer and having a computer readable recording device including a plurality of commands for generating a process model, wherein
   the commands cause the computer to execute:
   inputting pattern information including at least one of
   a dimension of pattern width of a test pattern formed on a film to be processed by exposing a test mask having a mask pattern,
   a dimension of pattern space of the test pattern,
   pattern position information in the entire area of the test pattern, and
   pattern density for each divided predetermined area in the test pattern;

generating, with respect to various pattern areas with different pattern information, a plurality of process models having a model parameter adjusted so as to correspond to the pattern information for each of the various pattern areas based on the input pattern information;

performing a simulation of the mask pattern by using each of the process models to predict a plurality of model patterns;

calculating a difference in dimension between the test pattern and each of the model patterns to the pattern information;

extracting a model pattern in which the difference in dimension from the test pattern is within a scope of specification from the model patterns for each area divided according to the pattern information; and specifying the process model, which predicts the extracted model pattern, for each area divided according to the pattern information of the mask pattern.

5. The computer program product according to claim 4, wherein when the process model is specified, a process model, which predicts the extracted model pattern, is specified for each area divided according to the pattern information of the test pattern.

6. The computer program product according to claim 4, wherein when the process model is specified, a process model, which predicts the model pattern having the smallest difference in dimension from the test pattern, is specified.

* * * * *